United States Patent
Park et al.

(10) Patent No.: US 7,428,954 B2
(45) Date of Patent: Sep. 30, 2008

(54) DAMPER FOR DRUM TYPE WASHING MACHINE

(75) Inventors: Seung Chul Park, Kyungki-do (KR); Si Moon Jeon, Seoul (KR); Gwan Ryong Park, Seoul (KR); Jae Hyun Kim, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/833,841

(22) Filed: Apr. 27, 2004

(65) Prior Publication Data

US 2005/0000765 A1     Jan. 6, 2005

(30) Foreign Application Priority Data

Jun. 17, 2003   (KR) .................... 10-2003-0039167

(51) Int. Cl.
*F16F 9/36* (2006.01)
*F16F 9/12* (2006.01)

(52) U.S. Cl. .................... 188/322.18; 188/322.17; 267/136

(58) Field of Classification Search ............ 188/322.16, 188/322.17, 322.18, 322.22, 381, 129, 266, 188/266.1; 267/201, 136, 137
See application file for complete search history.

(56) References Cited

U.S. PATENT DOCUMENTS

| | | | | |
|---|---|---|---|---|
| 3,435,919 A | * | 4/1969 | Platus et al. ................ | 188/372 |
| 4,838,393 A | * | 6/1989 | Mourray et al. ............. | 188/284 |
| 4,946,008 A | * | 8/1990 | Bauer et al. ................. | 188/129 |
| 5,257,680 A | * | 11/1993 | Corcoran et al. ............ | 188/129 |
| 6,264,014 B1 | * | 7/2001 | Ferlicca ...................... | 188/129 |
| 6,279,693 B1 | * | 8/2001 | Wiebe ......................... | 188/129 |
| 6,367,601 B1 | * | 4/2002 | Ferlicca ...................... | 188/381 |
| 6,397,985 B2 | * | 6/2002 | Wiebe ......................... | 188/129 |

FOREIGN PATENT DOCUMENTS

| | | |
|---|---|---|
| EP | 0407755 | 1/1991 |
| EP | 0702165 A2 * | 3/1996 |
| EP | 1243685 A2 * | 9/2002 |

* cited by examiner

*Primary Examiner*—Melody M Burch
(74) *Attorney, Agent, or Firm*—Lee, Hong, Degerman, Kang & Schmadeka

(57) ABSTRACT

Disclosed herein is a damper for use in a drum type washing machine, which can support a tub of the washing machine and absorb vibration of the tub. The damper comprises a cylinder, a piston partially inserted inside the cylinder, and a fixed damping member and movement prevention means, which are installed around an inserted portion of the piston inside the cylinder so that they are spaced apart from each other, and adapted to allow the piston to be stably supported inside the cylinder even in case that a tub of the washing machine vibrates in a non-axial direction of the cylinder and piston, thereby restricting a relative angular rotation of the cylinder and piston and preventing rubbing and collision caused between a lower end of the cylinder and the piston.

13 Claims, 6 Drawing Sheets

DAMPER FOR DRUM TYPE WASHING MACHINE

Pursuant to 35 U.S.C. 119(a), this application claims the benefit of Korean Patent Application No. 10-2003-0039167 filed on Jun. 17, 2003, the content of which is incorporated herein by reference in its entirety.

BACKGROUND OF THE INVENTION

1. Field of the Invention

The present invention relates to a damper installed in a drum type washing machine for supporting a tub as well as absorbing vibration of the tub, and more particularly to a damper for use in drum type washing machines, which prevents generation of rubbing and collision of a tub even in case of multi-directional vibration, resulting in an enhancement in reliability thereof.

2. Description of the Related Art

In general, a drum type washing machine comprises a drum horizontally installed therein for loading the laundry, washing water and detergent, and is adapted to perform washing of the laundry by making use of friction between the laundry and the drum as the drum is rotated by the driving force of a motor. Such a drum type washing machine almost never causes damage or tangling of the laundry, and provides good washing effects of the same quality as if the laundry were washed by hand.

The drum type washing machine further comprises a tub in which the drum is rotatably installed, and behind the tub is installed the motor so as to be connected to the drum of the tub.

In an installed state, an upper end of the tub is suspended within a cabinet, which defines an external appearance of the washing machine, by means of a pair of springs, and a lower end of the tub is supported on a base, formed as a bottom portion of the cabinet, by means of a pair of dampers. The springs are installed at both lateral positions on the upper end of the tub, and the dampers are installed at both lateral positions on the lower end of the tub.

With the construction as stated above, vibration, caused in the drum as the drum is rotated by the motor, is mostly absorbed by the springs and dampers as it is transmitted to the cabinet and base by passing through the tub.

FIG. 1 is a side sectional view illustrating a damper for use in a drum type washing machine in accordance with the prior art, and FIG. 2 is a side sectional view illustrating a state wherein non-axial load is applied to the damper for use in a drum type washing machine in accordance with the prior art.

As shown in FIG. 1, the conventional damper for use in a drum type washing machine, designated as reference numeral 10, comprises a cylinder 12 hingedly connected at an upper end thereof to the bottom of the tub, a piston 14 which is movably inserted from its upper end into a lower end of the cylinder 12 and is hingedly connected at its lower end to an upper surface of the base, a guide portion 16 extending from the upper end of the piston 14, a fixed damping member 18 which is fixed around an outer peripheral surface of the upper end of the piston 14 and is adapted to frictionally move along an inner peripheral surface of the cylinder 12, and a movable damping member 19 which is installed around the guide portion 16 in an axially movable manner and is adapted to frictionally move along the inner peripheral surface of the cylinder 12.

In this case, excessive vibration caused between the cylinder 12 and piston 14 may cause the movable damping member 19 to be unintentionally separated from the piston 14. In order to solve this problem, a stopper 16a radially protrudes from an upper end of the guide portion 16.

By virtue of the fixed damping member 18 and movable damping member 19 coming into close contact with the cylinder 12, when the piston 14 and cylinder 12 move relative to each other due to the vibration of the tub, the piston 14 frictionally moves inside the cylinder 12, thereby serving to attenuate the vibration of the tub.

In a normal state wherein the motor is driven at a constant speed, resulting in a relatively low production of vibration of the tub, only the fixed damping member 18 frictionally moves along the inner peripheral surface of the cylinder 12 so as to attenuate the vibration of the tub. In an inordinate state wherein the motor is driven at excessively high or low speed, resulting in a relatively large production of vibration of the tub, both the fixed damping member 18 and movable damping member 19 frictionally move together along the inner peripheral surface of the cylinder 12 so as to attenuate the vibration of the tub.

The movable damping member 19 is designed to produce a damping force greater than or equal to that of the fixed damping member 18.

Although the conventional damper 10 for use in a drum type washing machine can smoothly attenuate the vibration of the tub by means of the fixed damping member 18 and movable damping member 19 when the piston 14 moves relative to the cylinder 12 in an axial direction, if the tub vibrates in a non-axial direction of the damper 10, as shown in FIG. 2, it results in rubbing and collision of the piston 14 with cylinder 12.

As will be easily understood, a distance between the fixed damping member 18 and movable damping member 19 is variable during the axial relative movements of the piston 14 and cylinder 12. When the distance between the fixed damping member 18 and movable damping member 19 reaches the minimum, especially, if the tub vibrates in a non-axial direction of the damper 10, the piston 14 and cylinder 12 rotate relative to each other in an angular direction, and thus the piston 14 is inclined relative to the cylinder 12. This generates interference between the cylinder 12 and piston 14, thereby causing the lower end of the cylinder 12 to collide with the piston 14.

Such a relative angular rotation of the cylinder 12 and piston 14, further, results in the torsion of the fixed damping member 18 and movable damping member 19. This causes a contact force between the damping members 18 and 19 and the cylinder 12 to be varied depending on positions, and reduces a contact area therebetween, resulting in deterioration in damping performance of the damper 10.

In addition to the above problems, the conventional damper 10 has several problems including damage to constituent components due to the rubbing and collision of the cylinder 12 and piston 14, and periodic generation of noise due to the vibration of the tub, resulting in deterioration in reliability of products.

SUMMARY OF THE INVENTION

Therefore, the present invention has been made in view of the above problems, and it is an object of the present invention to provide a damper for use in a drum type washing machine, which can prevent the rubbing and collision between a cylinder and piston thereof even in case that a tub of the washing machine vibrates in a non-axial direction of the cylinder and piston, thereby achieving a reduction in damage to constituent components thereof and generation of noise.

In accordance with one aspect of the present invention, the above and other objects can be accomplished by the provision of a damper for use in a drum type washing machine comprising: a cylinder; a piston partially inserted inside the cylinder in a movable manner; a fixed damping member fixed around an inserted portion of the piston inside the cylinder so as to come into frictional contact with the cylinder; movement-prevention means provided around the inserted portion of the piston inside the cylinder at a position spaced apart from the fixed damping member by a certain distance, and adapted to prevent relative movement of the cylinder and piston in a non-axial direction; and a movable damping member installed between the fixed damping member and movement-prevention means in an axially movable manner, and adapted to selectively come into frictional contact with the cylinder according to a relative axial movement rate of the cylinder and piston.

The movable damping member may generate a damping force larger than or equal to that of the fixed damping member and movement-prevention means when they frictionally contact the cylinder.

The movable damping member may have a ring shape having an inner diameter larger than an outer diameter of the piston, and an outer peripheral surface of the movable damping member may come into close contact with an inner peripheral surface of the cylinder.

The piston may include a guide portion formed between the fixed damping member and movement-prevention means, the guide portion having a diameter smaller than a remaining portion of the piston, and the movable damping member may be movably installed at the guide portion.

The fixed damping member may be fixedly fitted at a distal end of the inserted portion of the piston, or be fitted at a position axially spaced apart from the distal end of the inserted portion of the piston.

The fixed damping member may have a ring shape so that its inner peripheral surface is fixed around an outer peripheral surface of the piston and its outer peripheral surface comes into close contact with an inner peripheral surface of the cylinder.

The movement-prevention means may be a damping member fixed at the position spaced apart from the fixed damping member by a certain distance so as to come into close contact with the inner peripheral surface of the cylinder, or the fixed damping member fixed at the distal end of the inserted portion of the piston.

The damping member may be the fixed damping member.

The movement-prevention means may be a support member fixed at the position spaced apart from the fixed damping member by a certain distance so as to come into close contact with the inner peripheral surface of the cylinder, or may be a support member fixed at the distal end of the inserted portion of the piston.

The movement-prevention means may be a support member protruding from the distal end of the inserted portion of the piston, or from a position spaced apart from the fixed damping member by a certain distance so as to come into close contact with the inner peripheral surface of the cylinder.

The movement-prevention means may be a support member fixed at or protruding from the distal end of the inserted portion of the piston, or from a position spaced apart from the fixed damping member by a certain distance so as to come into close contact with the inner peripheral surface of the cylinder.

In accordance with another aspect of the present invention, the above and other objects can be accomplished by the provision of a damper for use in a drum type washing machine comprising: a cylinder; a piston partially inserted inside the cylinder in a movable manner; a movable damping member installed around an inserted portion of the piston inside the cylinder in an axially movable manner, and adapted to selectively come into frictional contact with the cylinder according to a relative axial movement rate of the cylinder and piston; and a pair of movement-prevention means axially spaced apart from each other around the inserted portion of the piston, and adapted to come into close contact with an inner peripheral surface of the cylinder, thereby preventing a non-axial relative movement of the cylinder and piston.

At least one of the movement-prevention means may be a damping member to be in frictional contact with the cylinder.

The pair of the movement-prevention means may be arranged at opposite sides of the movable damping member, respectively, so that they are spaced apart from the movable damping member by certain distances.

The movable damping member, when being in frictional contact with the cylinder, may generate a damping force larger than or equal to that generated by the pair of the movement-prevention means.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1:
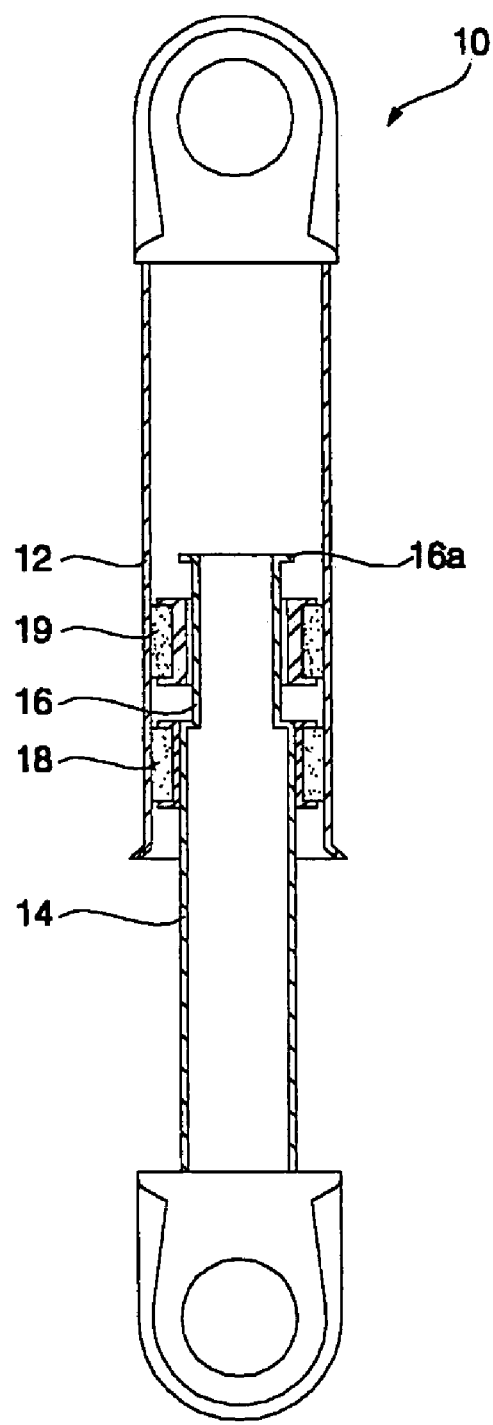
FIG. 1 is a side sectional view illustrating a conventional damper for use in drum type washing machines.
Figure 2:
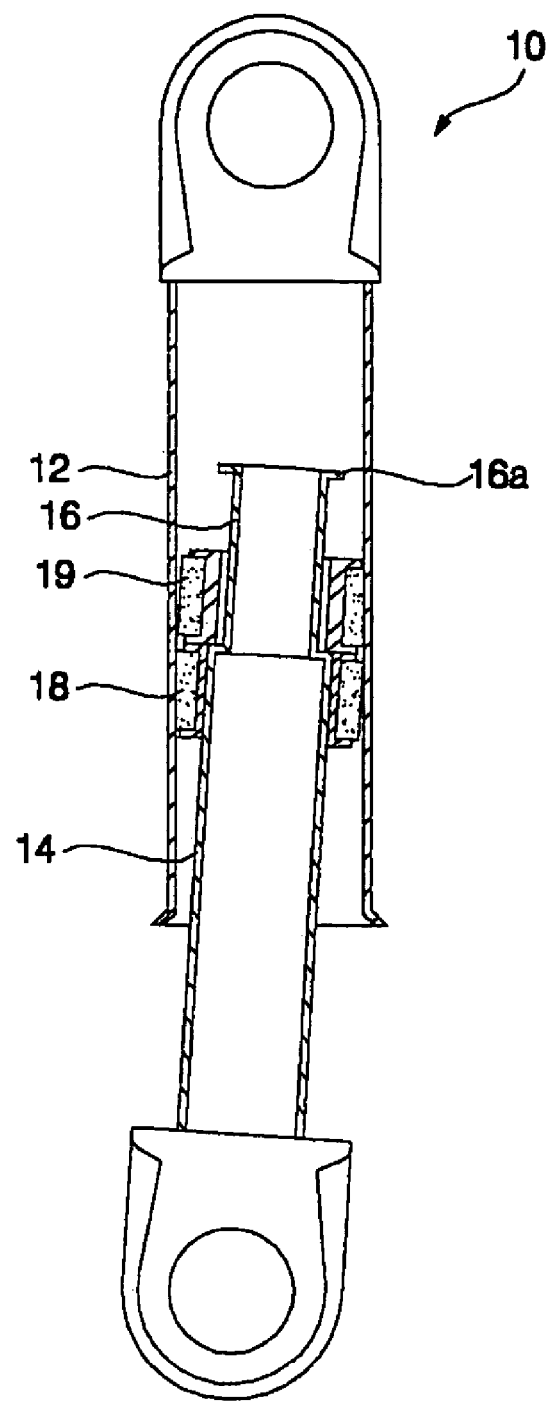
FIG. 2 is a side sectional view illustrating a state wherein a non-axial load is applied to the conventional damper for use in drum type washing machines.
Figure 3:
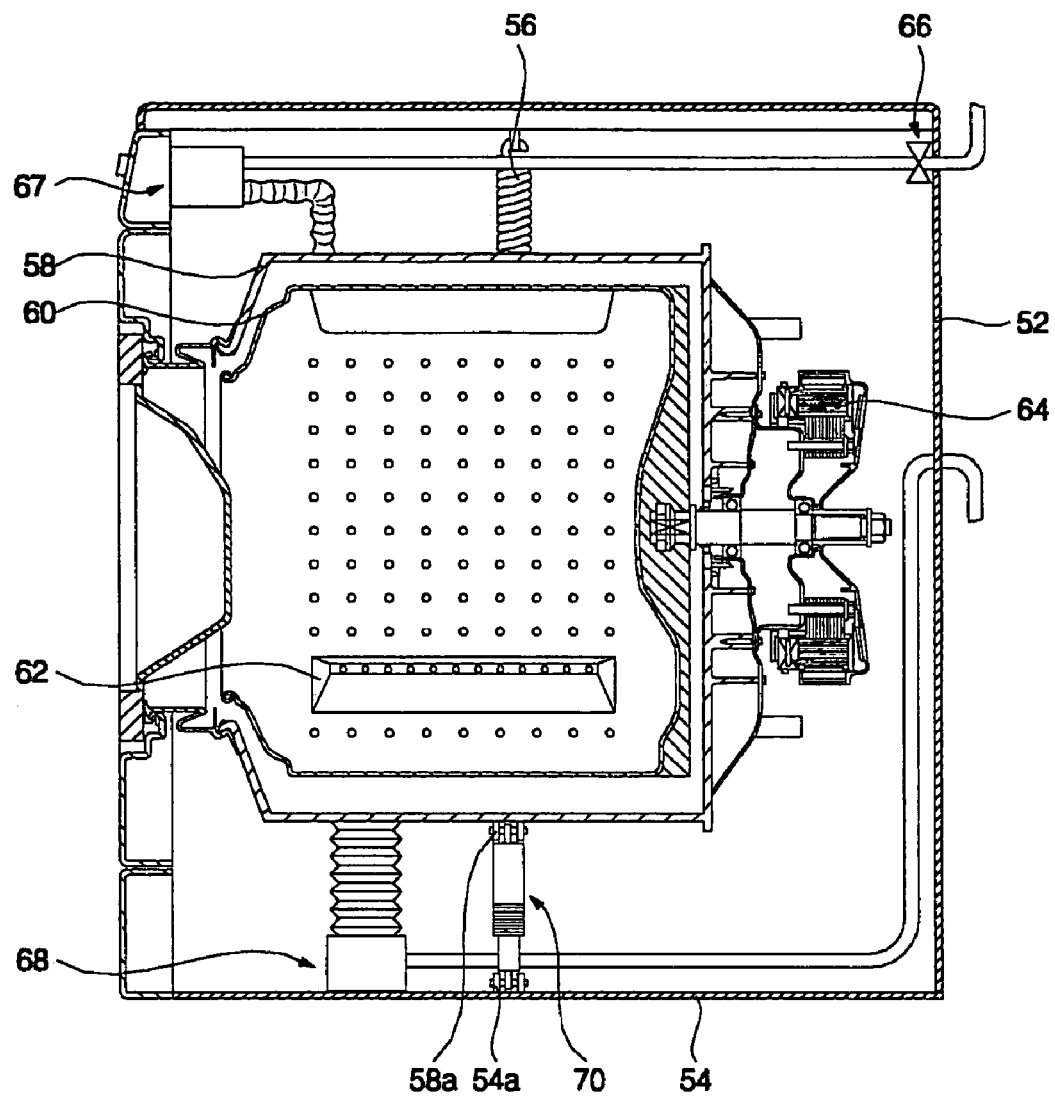
FIG. 3 is a side sectional view illustrating a drum type washing machine installed with a damper in accordance with the present invention.

FIG. 3 is a side sectional view illustrating a drum type washing machine installed with a damper in accordance with the present invention.

As shown in FIG. 3, the drum type washing machine, installed with dampers in accordance with the present invention, comprises a cabinet 52 defining the external appearance thereof, a base 54 formed as the bottom portion of the cabinet 52 a tub 58 suspended within the cabinet 52 by means of springs 56 as well as supported over the base 54 by means of dampers 70, a drum 60 rotatably installed inside the tub 58 and configured to accommodate the laundry and washing water for performing washing of the laundry, lifters 62 which are installed at inner wall surfaces of the drum 60 and adapted to lift up the laundry according to the rotation of the drum 60 and allow the laundry to drop due to the force of gravity, and a motor 64 installed behind the tub 58 so as to be connected to the drum 60 for rotating the drum 60.

Above the tub 58 there are installed a water supply valve assembly 66 and a detergent box assembly 67 for supplying the washing water and detergent into the tub 58. Under the tub 58 there is installed a drainage valve assembly 68 for draining the used washing water from the tub 58.

The tub 58 is installed in such a manner that an upper end of the tub 58 is suspended from an inner top surface of the cabinet 52 by means of the springs 56 located at both lateral positions thereof, and a lower end of the tub 58 is supported by an upper surface of the base 54 by means of the dampers 70 hingedly connected to both lateral positions thereof. With this installed configuration, the tub 58 is less affected by vibration caused as the drum 60 is rotated.

Figure 4:
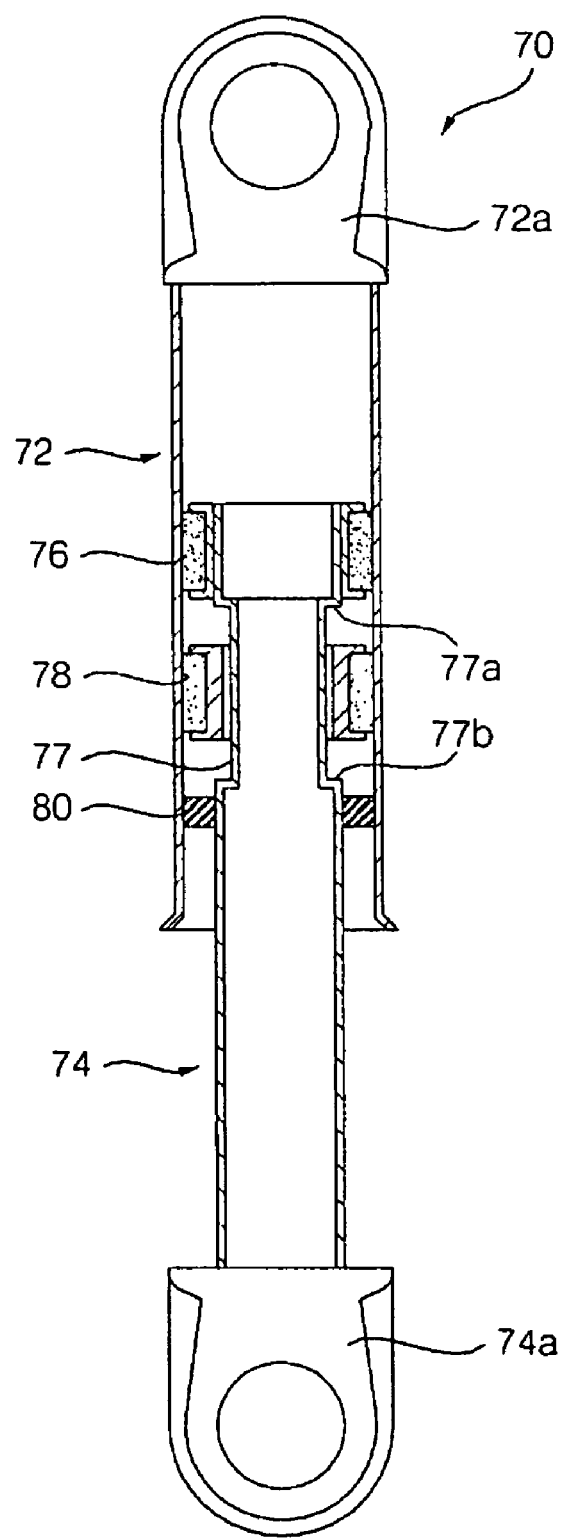
FIG. 4 is a side sectional view illustrating a first embodiment of the damper for use in drum type washing machines in accordance with the present invention.

FIG. 4 is a side sectional view illustrating a damper for use in drum type washing machines in accordance with a first embodiment of the present invention.

As shown in FIG. 4, the damper for use in drum type washing machines in accordance with the first embodiment of the present invention, designated as reference numeral 70, comprises a cylinder 72, a piston 74, a fixed damping member 76, movement-prevention means (see support member 80), and a movable damping member 78. The cylinder 72 is hingedly connected at its upper end to the tub 58, and into a lower end of the cylinder 72 is movably inserted an upper end of the piston 74. The piston 74 is hingedly connected at its lower end to the base 54. The fixed damping member 76 is fixedly fitted around an outer peripheral surface of the upper end of the piston 74 so that it comes into frictional contact with an inner peripheral surface of the cylinder 72 according to the movement of the piston 74. The movement-prevention means is provided around the outer peripheral surface of the piston 74 at a position spaced apart from the fixed damping member 76 by a certain distance, and is adapted to prevent the non-axial movement of the piston 74. Between the fixed damping member 76 and movement-prevention means is provided the movable damping member 78. The movable damping member 78 is installed around the outer peripheral surface of the piston 74 in an axially movable manner so that it comes into frictional contact with the inner peripheral surface of the cylinder 72 according to the relative axial movements of the piston 74 and cylinder 72.

The cylinder 72 has a hollow tubular shape, and is formed at the upper end thereof with a cylinder holder 72a, which will be hingedly connected to an associated one of cylinder fixtures 58a formed at both lateral positions of the lower end of the tub 58.

The piston 74 has a solid tubular shape wherein a diameter thereof is smaller than that of the cylinder 72, and is formed at the lower end thereof with a piston holder 74a, which will be hingedly connected to an associated one of piston fixtures 54a formed at both lateral positions of the upper end of the base 54.

The fixed damping member 76 and movement-prevention means are arranged at a portion of the piston 74 to be inserted into the cylinder 72, and are spaced apart from each other by a certain distance. Between the fixed damping member 76 and movement-prevention means, the piston 74 also includes a guide portion 77. The guide portion 77 has a diameter smaller than that of the piston 74, and serves to guide the movement of the movable damping member 78.

The fixed damping member 76 takes the form of a ring, and is installed so that its inner peripheral surface is fixed around the outer peripheral surface of the upper end of the piston 74, and its outer peripheral surface comes in close contact with the inner peripheral surface of the cylinder 72, thereby serving to generate a frictional force during the relative movements of the piston 74 and cylinder 72.

The movable damping member 78 is installed so that its outer peripheral surface comes into close contact with the inner peripheral surface of the cylinder 72 while preventing its inner peripheral surface from coming into contact with an outer peripheral surface of the guide portion 77. For this, the movable damping member 78 takes the form of a ring wherein its inner diameter is larger than an outer diameter of the guide portion 77, while its outer diameter is equal to that of the fixed damping member 76.

The movable damping member 78 is designed to generate a damping force lager than the total damping force generated by both the fixed damping member 76 and movement-prevention means when they come into frictional contact with the cylinder 72. In order to secure smooth movement of the piston 74, furthermore, solid lubricants, such as grease may be applied to the fixed damping member 76 and movable damping member 78.

In a normal state wherein the motor 64 is driven at a constant speed, resulting in a relatively low production of vibration of the tub, only the fixed damping member 76 frictionally moves along the inner peripheral surface of the cylinder 72. In an inordinate state wherein the motor 64 is driven at excessively high or low speed, resulting in a relatively large production of vibration of the tub, both the fixed damping member 76 and movable damping member 78 frictionally move together along the inner peripheral surface of the cylinder 72, thereby attenuating the vibration of the tub 58.

The movement-prevention means is a support member 80 formed around the outer peripheral surface of the piston 74 so as to come into close contact with the inner peripheral surface of the cylinder 72. The support member 80 is spaced apart from the fixed damping member 76 by a certain distance so as to allow the guide portion 77 to be defined therebetween.

Explaining the support member 80 in detail, the support member 80 is a separate ring-shaped member, which protrudes radially around the outer peripheral surface of the piston 74 so as to come into close contact, at its outer edge, with the inner peripheral surface of the cylinder 72, or which is fixed at the outer peripheral surface of the piston 74 so as to come into close contact, at its overall outer peripheral surface, with the cylinder 72.

Such an arrangement of the support member 80 and fixed damping member 76 enables the piston 74 to be stably supported inside the cylinder 72, and has an effect of guiding the movement of the piston 74 inside the cylinder 72.

The support member 80 further provides a damping force as its outer peripheral surface comes into frictional contact with the inner peripheral surface of the cylinder 72.

Now, the operation and effects of the damper 70 for use in drum type washing machines in accordance with the present invention will be explained.

As the motor 64 is operated in a state wherein the drum 60 accommodates the laundry, the drum 60 performs washing and rinsing cycles according to the rotation thereof while the lifters 62 are operated to lift up the laundry and drop it due to the force of gravity. After completion of the washing and rinsing cycles, the drum 60 further rotates at a higher speed, thereby performing a dehydrating cycle in such a manner that washing water is removed from the laundry by virtue of a centrifugal force.

Although the drum 60 vibrates during rotation thereof, and the resulting vibration is transmitted toward the tub 58, since the tub 58 is supported by means of the springs 56 and the dampers 70 as stated above, the tub 58 attenuates the transmission of the vibration to the cabinet 52.

In this case, when the tub 58 vibrates in an axial direction of the damper 70, the cylinder 72 and piston 74 of the damper 70 move relative to each other in the axial direction, and thus the fixed damping member 76 and movable damping member 78 attenuate the vibration of the tub 58.

That is, in a normal state wherein the rotating speed of the motor 64 is constant and thus the vibration of the tub 58 is relatively small, the fixed damping member 76 and support member 80 frictionally move relative to the inner peripheral surface of the cylinder 72, thereby attenuating the vibration of the tub 58. Differently, in an inordinate state wherein the rotating speed of the motor 64 is excessively high or low and thus the vibration of the tub 58 is relatively large, the fixed damping member 76, movable damping member 78, and support member 80 frictionally move together relative to the inner peripheral surface of the cylinder 72, thereby attenuating the vibration of the tub 58.

Meanwhile, if the tub 58 vibrates in a non-axial direction of the damper 70 due to variation in the rotating speed of the motor 64 or other external shock, the cylinder 72 and piston 74 move relative to each other in an inclined direction relative to the axial direction, that is, in the non-axial direction of the damper 70.

In this case, the inclination of the piston 74 is limited within a predetermined angle since the piston 74 is supported inside the cylinder 72 by means of the fixed damping member 76 and support member 80 as movement-prevention means, which are spaced apart from each other by a certain distance. This has an effect of preventing generation of conventional rubbing and collision problems caused by the inclined cylinder 72 and piston 74, and preventing contact failure of the fixed damping member 76 and movable damping member 78.

Figure 5:
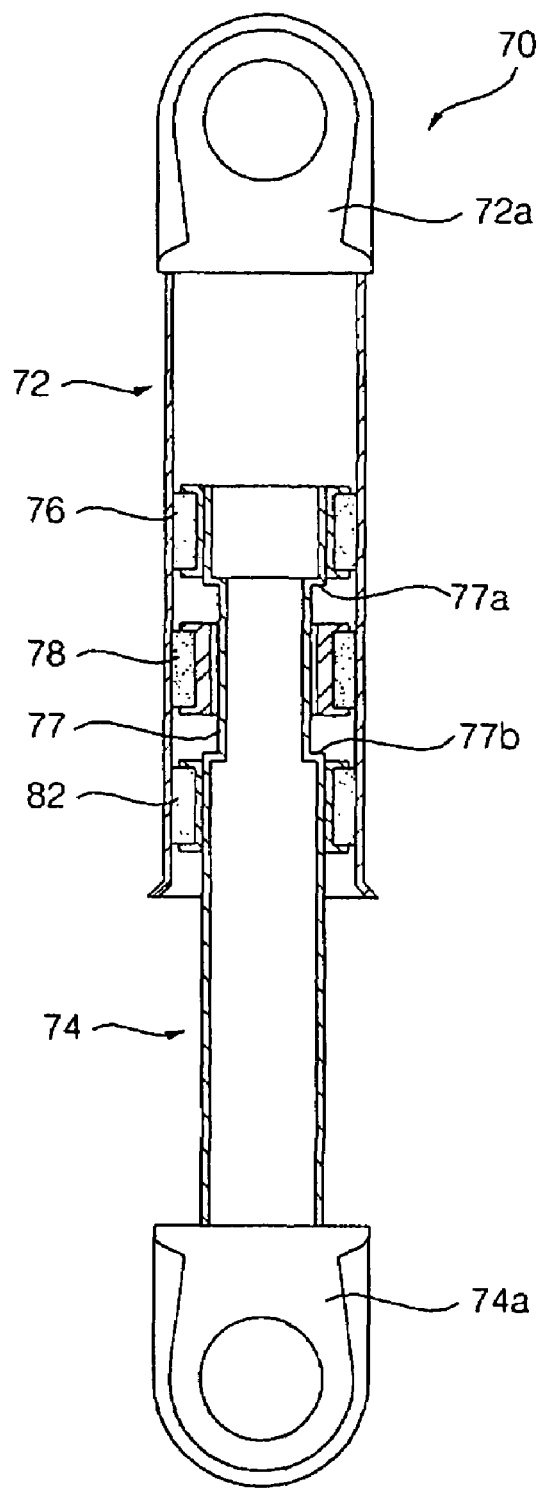
FIG. 5 is a side sectional view illustrating a second embodiment of the damper for use in drum type washing machines in accordance with the present invention.

FIG. 5 is a side sectional view illustrating a second embodiment of the damper 70 for use in drum type washing machines in accordance with the present invention.

As shown in FIG. 5, the damper 70 for use in drum type washing machines in accordance with the second embodiment of the present invention, is similar to that of the above described first embodiment, except that the movement-prevention means is embodied in a damping member 82 formed around the outer peripheral surface of the piston 74 so as to come into contact with the inner peripheral surface of the cylinder 72. In the same manner as the first embodiment, a second damping member 82 is spaced apart downward from a first fixed damping member 76 in order to allow the guide portion 77 to be formed therebetween.

The second damping member 82 takes the form of a ring, and is installed so that its inner peripheral surface is fixed around the outer peripheral surface of the piston 54, and its outer peripheral surface comes into frictional contact with the inner peripheral surface of the cylinder 72. As will be clearly understood, the first fixed damping member 76 can be used as the second damping member 82.

By adopting such a second damping member 82, the present embodiment achieves a damping force larger than that of the first embodiment, resulting in enhancement in damping performance of the damper 70.

The piston 74 includes a guide portion 77 formed between the first damping member 76 and the second damping member 82, and the guide portion has a diameter smaller than a remaining portion of the piston such that an upper step portion 77a and a lower step portion 77b are protruded radially from each end of the guide portion 77. The upper step portion 77a is formed at a lower end of the first damping member 76 and lower step portion 77b is formed at an upper end of the second damping member 82. The movable damping member 78 is installed at the guide portion 77.

As the piston moves downward during the damping process, the upper step portion 77a of the piston 74 comes into contact with the movable damping member 78 and the movable damping member 78 moves downward with the piston 74.

As the piston moves upward during the damping process, the lower step portion 77b of the piston 74 comes into contact with movable damping member 78 and the movable damping member 78 moves upward with the piston 74.

Figure 6:
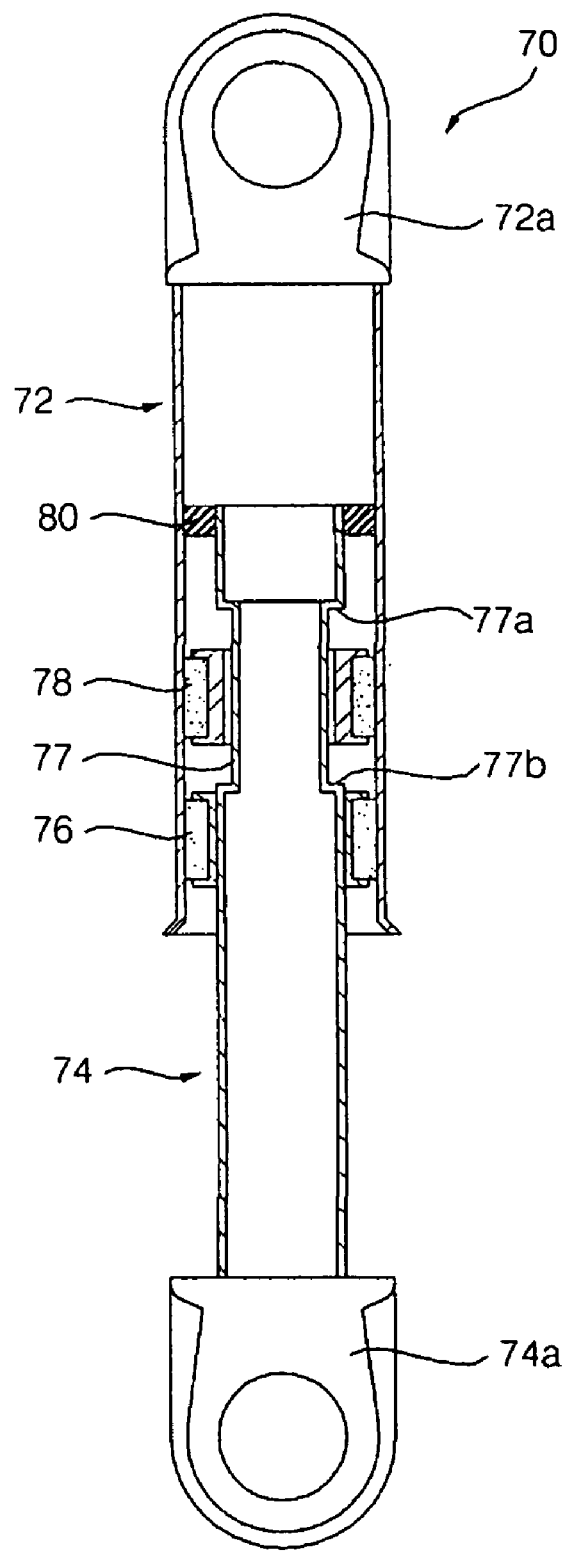
FIG. 6 is a side sectional view illustrating a third embodiment of the damper for use in drum type washing machines in accordance with the present invention.

FIG. 6 is a side sectional view illustrating a third embodiment of the damper for use in drum type washing machines in accordance with the present invention.

As shown in FIG. 6, the damper 70 for use in drum type washing machines in accordance with the third embodiment of the present invention, is similar to that of the above described first embodiment, except that the movement-prevention means (see support member 80) is positioned around the outer peripheral surface of the upper end of the piston 74, and the fixed damping member 76 is spaced apart from the movement-prevention means so as to allow the guide portion 77 to be formed therebetween.

In the present embodiment, the movement-prevention means is the support member 80 formed around the outer peripheral surface of the upper end region of the piston 74 so as to come into close contact with the inner peripheral surface of the cylinder 72. The support member 80 is a separate ring-shaped member, which protrudes radially around the outer peripheral surface of the upper end of the piston 74 so as to come into close contact, at its outer edge, with the inner peripheral surface of the cylinder 72, or which is fixed around the outer peripheral surface of the piston 74 so as to come into close contact, at its overall outer peripheral surface, with the cylinder 72.

Alternately, in the same manner as the above second embodiment, the damping member 82, which is fitted around the outer peripheral surface of the piston 74 so as to come into contact with the inner peripheral surface of the cylinder 72, may be used as the movement-prevention means.

As apparent from the above description, the present invention provides a damper for use in a drum type washing machine configured in such a fashion that a piston is partially inserted into a cylinder, and a fixed damping member and movable damping member are spaced at an inserted portion of the piston, so as to enable the piston to be stably supported inside the cylinder by means of the fixed damping member and movable damping member even in case that the a tub of the washing machine vibrates in a non-axial direction of the cylinder and piston, thereby restricting the relative angular rotation of the cylinder and piston and thus preventing the rubbing and collision between the piston and a lower end region of the cylinder.

Further, by virtue of such a restriction in the relative angular rotation of the cylinder and piston, the vibration load of the tub is transmitted to the damper only in an axial direction, thereby enabling the damper to effectively attenuate the vibration of the tub.

Furthermore, as a result of preventing the rubbing and collision between the piston and the lower end region of the cylinder by means of the fixed damping member and movable damping member, it is possible to prevent damage to the damper and thus extend the lifespan of constituent components, and to prevent periodic generation of noise caused by the cylinder and piston during the vibration of the tub.

As stated above, according to the present invention, it is possible to extend the lifespan of the damper, to effectively attenuate the vibration of the tub, and to reduce the generation of noise in the damper and thus secure more smooth and silent driving of the drum type washing machine, resulting in enhancement in reliability of products.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A damper for use in a drum type washing machine, the damper comprising:
    a cylinder;
    a piston partially inserted inside the cylinder in a movable manner, the piston comprising a guide portion, the guide portion having a diameter smaller than a remaining portion of the piston such that a radially protruding upper step portion and a radially protruding lower step portion are formed;
    a first damping member fixed around an inserted portion of the piston inside the cylinder so as to come into frictional contact with the cylinder, the first damping member located above the upper step portion of the piston;
    a second damping member fixed around the inserted portion of the piston inside the cylinder at a position spaced apart from the first damping member by a certain fixed axial distance and adapted to limit relative movement of the cylinder and the piston in a non-axial direction, the second damping member located below the lower step portion of the piston; and
    a movable damping member installed at the guide portion of the piston between the upper step portion and the lower step portion in an axially movable manner with respect to the piston such that the axial distance between the movable damping member and both the first damping member and the second damping member is not fixed, the movable damping member adapted to come into frictional contact with the cylinder whenever the movable damping member moves upward by the lower step portion of the piston during upward moving process of the piston and moves downward by the upper step portion of the piston during downward moving process of the piston,
    wherein each of the first damping member and the second damping member has a ring shape so that an inner peripheral surface of each of the first damping member and the second damping member is affixed to an outer peripheral surface of the piston, and
    wherein the first damping member and the second damping member generate a damping force when the piston moves inside the cylinder.

2. The damper as set forth in claim 1, wherein the movable damping member generates a damping force that is larger than or equal to the combined damping force generated by the first damping member and the second damping member when they frictionally contact the cylinder.

3. The damper as set forth in claim 2, wherein the movable damping member has a ring shape having an inner diameter larger than an outer diameter of the piston and an outer peripheral surface of the movable damping member comes into close contact with an inner peripheral surface of the cylinder.

4. The damper as set forth in claim 1, wherein the first damping member is fixedly fitted at an upper end of the inserted portion of the piston.

5. The damper as set forth in claim 1, wherein the second damping member protrudes from the inserted portion of the piston.

6. The damper as set forth in claim 4, wherein the second damping member is a support member.

7. The damper as set forth in claim 4, wherein the second damping member protrudes from the inserted portion of the piston.

8. The damper as set forth in claim 1, wherein the first damping member is installed at a position axially spaced apart from a distal end of the inserted portion of the piston.

9. The damper as set forth in claim 1, wherein the second damping member protrudes from the distal end of the inserted portion of the piston.

10. The damper as set forth in claim 8, wherein the second damping member is a support member.

11. The damper as set forth in claim 8, wherein the second damping member protrudes from the distal end of the inserted portion of the piston.

12. A damper for use in a drum type washing machine, the damper comprising:
    a cylinder;
    a piston partially inserted inside the cylinder in a movable manner, the piston comprising a guide portion, the guide portion having a diameter smaller than a remaining portion of the piston such that a radially protruding upper step portion and a radially protruding lower step portion are formed;
    a first movement-prevention means provided around an inserted portion of the piston inside the cylinder and adapted to come into close contact with an inner peripheral surface of the cylinder, thereby limiting non-axial relative movement of the cylinder and piston, the first movement-prevention means located above the upper step portion of the piston;
    a second movement-prevention means provided around the inserted portion of the piston inside the cylinder at a position spaced apart from the first movement-prevention means by a certain fixed axial distance and adapted to come into close contact with an inner peripheral surface of the cylinder, thereby limiting non-axial relative movement of the cylinder and piston, the second movement-prevention means located below the lower step portion of the piston; and
    a movable damping member installed at the guide portion of the piston between the upper step portion and the lower step portion in an axially movable manner with respect to the piston such that the axial distance between the movable damping member and both the first and second movement-prevention means is not fixed, the movable damping member adapted to come into frictional contact with the cylinder whenever the movable damping member moves upward by the lower step portion of the piston during upward moving process of the piston and moves downward by the upper step portion of the piston during downward moving process of the piston,
    wherein one of the first movement-prevention means and the second movement-prevention means is a damping member in frictional contact with the cylinder.

13. The damper as set forth in claim 12, wherein the movable damping member, when in frictional contact with the cylinder, generates a damping force that is larger or equal to the combined damping force generated by the first movement-prevention means and the second movement-prevention means.

* * * * *